US011885133B2

(12) United States Patent
Lyons

(10) Patent No.: US 11,885,133 B2
(45) **Date of Patent: *Jan. 30, 2024**

(54) SOFFIT VENT

(71) Applicant: James Robert Lyons, San Jose, CA (US)

(72) Inventor: James Robert Lyons, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,533

(22) Filed: Jun. 30, 2022

(65) Prior Publication Data

US 2022/0333385 A1 Oct. 20, 2022

Related U.S. Application Data

(63) Continuation of application No. 17/109,020, filed on Dec. 1, 2020, now Pat. No. 11,408,179, which is a continuation of application No. 16/562,751, filed on Sep. 6, 2019, now abandoned.

(60) Provisional application No. 62/736,818, filed on Sep. 26, 2018.

(51) Int. Cl.

| | |
|---|---|
| ***E04D 13/152*** | (2006.01) |
| *E05D 3/02* | (2006.01) |
| *F24F 11/35* | (2018.01) |
| *F24F 7/02* | (2006.01) |
| *F24F 7/00* | (2021.01) |

(52) U.S. Cl.
CPC .............. *E04D 13/152* (2013.01); *E05D 3/02* (2013.01); *F24F 7/02* (2013.01); *F24F 11/35* (2018.01); *F24F 2007/0025* (2021.01)

(58) Field of Classification Search
CPC ....... E04D 13/152; E04D 13/158; E04D 3/02; E05Y 2900/612; F24F 7/02; F24F 11/35; F24F 2007/0025
See application file for complete search history.

(56) References Cited

U.S. PATENT DOCUMENTS

| | | |
|---|---|---|
| 2,195,704 A | 4/1940 | Bertha |
| 2,267,806 A | 12/1941 | Anderson |
| 2,718,187 A | 9/1955 | Frisby |
| 2,755,728 A | 7/1956 | Frisby |

(Continued)

FOREIGN PATENT DOCUMENTS

| | | |
|---|---|---|
| WO | 2015033174 A1 | 3/2015 |

OTHER PUBLICATIONS

Bickford, Charles, "A Path to Safer Balconies", Professional Deck Builder, Mar./Apr. 2016, 5 pages.

(Continued)

*Primary Examiner* — James M Ference
(74) *Attorney, Agent, or Firm* — Suiter Swantz pc llo

(57) ABSTRACT

An exterior elevated assembly with a walking surface is described which has features for facilitating inspection of the interior support frame of the assembly. The assembly includes a support frame for the walking surface, which defines an interior space and a soffit covering an underside of the support frame. The soffit provided with an opening. A vent panel is provided for covering the opening and a vent panel retention mechanism is provided for reversibly holding the vent panel in place over the opening. Methods and kits for installing a vent panel in a soffit of an exterior elevated assembly with a walking surface are also described.

18 Claims, 11 Drawing Sheets

(56) References Cited

U.S. PATENT DOCUMENTS

| | | | |
|---|---|---|---|
| 2,780,978 | A | 2/1957 | Peirson |
| 3,051,071 | A | 8/1962 | Leigh |
| 3,125,942 | A | 3/1964 | Smith |
| 3,232,205 | A | 2/1966 | Bumstead |
| 4,195,455 | A | 4/1980 | Chalmers et al. |
| 4,315,455 | A | 2/1982 | Shaklee |
| 4,461,128 | A | 7/1984 | Knoebl |
| 4,502,368 | A | 3/1985 | Hempel |
| 4,593,493 | A | 6/1986 | Naka et al. |
| 4,667,581 | A | 5/1987 | Hovland |
| 4,819,390 | A | 4/1989 | Capper et al. |
| 5,377,463 | A | 1/1995 | Howe |
| 5,799,446 | A | 9/1998 | Tamlyn |
| 5,815,996 | A | 10/1998 | Granger |
| 5,937,592 | A | 8/1999 | Tamlyn |
| 6,220,956 | B1 | 4/2001 | Kilian et al. |
| 6,250,219 | B1 | 6/2001 | Garvin |
| 6,347,991 | B1 | 2/2002 | Bogrett et al. |
| 6,705,052 | B1 | 3/2004 | Larson |
| 6,754,995 | B1 | 6/2004 | Davis et al. |
| 6,767,279 | B1 | 7/2004 | Serrano |
| 7,191,845 | B2 | 3/2007 | Loar |
| 7,281,972 | B2 | 10/2007 | Tocher |
| 7,413,024 | B1 | 8/2008 | Simontacchi et al. |
| 7,484,335 | B1 | 2/2009 | Dunlap |
| 7,501,576 | B2 | 3/2009 | Gagliardi |
| 7,987,649 | B1 | 8/2011 | Polston |
| 8,528,271 | B1 | 9/2013 | Hemmer |
| 8,661,768 | B2 | 3/2014 | Alkhrdaji et al. |
| 8,850,752 | B1 * | 10/2014 | Graboski ................ E04D 13/17 52/95 |
| 8,881,469 | B1 | 11/2014 | Meyer |
| 9,311,832 | B2 | 4/2016 | Kanai |
| 2001/0023173 | A1 | 9/2001 | Schiedegger et al. |
| 2002/0124484 | A1 | 9/2002 | Martin |
| 2004/0144045 | A1 | 7/2004 | Granger |
| 2006/0240762 | A1 | 10/2006 | Railkar et al. |
| 2007/0049190 | A1 | 3/2007 | Singh |
| 2007/0094953 | A1 * | 5/2007 | Galeazzo .................. F24F 7/02 454/365 |
| 2008/0072503 | A1 | 3/2008 | Brochu et al. |
| 2008/0233862 | A1 | 9/2008 | Hemmer |
| 2009/0071087 | A1 | 3/2009 | Achen |
| 2009/0113806 | A1 | 5/2009 | Manno |
| 2010/0071311 | A1 | 3/2010 | D'Amico |
| 2012/0174527 | A1 | 7/2012 | Hinshaw et al. |
| 2013/0227900 | A1 * | 9/2013 | Peterson ............... E04D 13/172 52/302.1 |
| 2013/0247480 | A1 | 9/2013 | Ridgway |
| 2014/0273809 | A1 | 9/2014 | Monzon |
| 2016/0053475 | A1 | 2/2016 | Locker et al. |
| 2017/0226744 | A1 | 8/2017 | Platts |
| 2019/0186146 | A1 | 6/2019 | Savchyshyn |
| 2020/0095772 | A1 | 3/2020 | Lyons |
| 2020/0165808 | A1 | 5/2020 | Carolan |
| 2020/0190895 | A1 | 6/2020 | Wilson et al. |

OTHER PUBLICATIONS

How to Install Soffit Vents (Fast) by Mark Greer, https://www.youtibe.com/watch?v=ujll3xC4Log, 912/2015 (Year:2015).

http://returnairgrilles.com/rick/rickenbacker-return-air-grille-with-filter-hinge.html—first archived on the internet on Oct. 31, 2014.

Web Archive WB GP LV 103 Series Louvered Premium Access Door, https://web.archive.org/web/20170623044609/https://www.wbdoors.com/wb_gp_103.html, Jun. 23, 2017, accessed Dec. 9, 2021 (Year:2017).

* cited by examiner

SOFFIT VENT

CROSS-REFERENCE TO RELATED APPLICATIONS

This application is a continuation of U.S. patent application Ser. No. 17/109,020 filed on Dec. 1, 2020, which is a continuation of U.S. patent application Ser. No. 16/562,751 filed on Sep. 6, 2019, which claims priority to U.S. Provisional Patent Application Ser. No. 62/736,818 filed on Sep. 26, 2018, the entire disclosures of which are incorporated herein by reference.

FIELD OF THE INVENTION

The invention relates to vents in soffits of buildings and more particularly to vents configured to provide access to the interior space above a soffit to facilitate inspection of structures therewithin.

BACKGROUND

A soffit is an exterior or interior architectural feature, generally the underside of any construction element. It is known to provide soffits with ventilation features to allow airflow inside the area of the building adjacent the soffit to prevent accumulation of moisture which leads to various problems, such as growth of mold, for example. Such soffit vents have been provided with structures having intumescent coatings which expand when the material is heated, to seal the vent openings in the event of a fire in the building, to prevent the fire from spreading into the building via the soffit and to reduce the access of oxygen to the interior of the soffit if a fire is contained within the soffit. In U.S. Pat. Nos. 7,191,845, and 7,413,024, (each of which is incorporated herein by reference in its entirety) vent structures are provided by a screen surrounded by a peripheral frame in a combination which has no moving parts. When these vent structures are subjected to the elevated temperatures of an external fire, the intumescent coating expands to close the cells representing vent openings, thus preventing flames, heat, and gaseous fumes from entering the building.

In 2015, a group of 13 students in Berkeley, Calif., fell five stories when the balcony they were standing on suddenly collapsed. Six were killed, seven were critically injured, and the incident became the latest example of the often-fatal consequences of poor building practices. The 4-foot-5-inch by 8-foot-10-inch balcony wasn't overloaded; it was designed to support combined live and dead loads of more than 100 lbs. per square foot (the code requirement at the time it was built). Subsequent investigations revealed several problems including a leaky walking surface and a non-ventilated deck soffit that trapped water inside the deck frame, causing the engineered (but not pressure-treated) wood framing to rot.

An analysis of structural features of balconies and potential solutions to the problems is described in an article entitled "A Path to Safer Balconies" (C. Bickford, *Professional Deck Builder*, March/April 2016; www.deckmagazine.com), incorporated herein by reference in its entirety.

There continues to be a need for improving structural features of soffits to improve the safety of buildings.

SUMMARY

One aspect of the invention is a soffit vent for providing access to an interior space above a soffit via an opening in the soffit, the soffit vent comprising: a) a panel for covering the opening; and b) a panel retention mechanism for reversibly holding the panel in place over the opening.

In some embodiments, the soffit vent further comprises a frame covering boundary edges of the opening, wherein the panel retention mechanism includes at least one fastener or retention member for holding the panel in proximity to the frame.

In some embodiments, the soffit vent further comprises a pivoting or flexible connector for connecting one side of the panel to the soffit or to one side of the frame.

In some embodiments of the soffit vent, the pivoting connector is a hinge.

In some embodiments of the soffit vent, the hinge is a piano hinge.

In some embodiments of the soffit vent, the flexible connector is a cord or strap.

In some embodiments of the soffit vent, the fastener is a screw or bolt for connecting the panel to the frame.

In some embodiments of the soffit vent, the frame comprises an inner lip on one internal edge and the screw or bolt connects an edge of the panel to the lip.

In some embodiments of the soffit vent, the retention member is pivotably connected to the frame and pivots on an axis perpendicular to the outer surface of the soffit or the frame between a retention position and an open position.

In some embodiments of the soffit vent, the opening has sufficient width to permit an inspector to place his or her head inside the opening.

In some embodiments of the soffit vent, the width of the opening is at least about 9 inches.

In some embodiments, the soffit vent further comprises a heat activatable fire barrier connected to an inside surface of the panel.

Another aspect of the invention is a method for retrofitting an existing soffit to permit repeated visual inspection of an interior space above the soffit and structures contained therewithin, the method comprising: a) cutting the soffit to remove a portion thereof and provide an opening therein; and b) covering the opening with a soffit vent panel having a reversible retention mechanism allowing the soffit vent to be removed from the opening, thereby permitting the visual inspection and allowing subsequent replacement of the soffit vent to cover the opening.

In some embodiments of the method, the opening has dimensions sufficient to permit an inspector to place his or her head inside the opening, thereby facilitating the visual inspection.

In some embodiments of the method, the method further comprises providing a frame on at least a portion of the boundary of the opening.

In some embodiments of the method, the frame is provided on the entire boundary of the opening.

In some embodiments of the method, the reversible retention mechanism comprises at least one fastener or pivotable retention member for retaining the soffit vent within the frame.

In some embodiments of the method, the method further comprises providing one or more pivotable or flexible connectors between the frame and the panel.

In some embodiments of the method, the connector are hinges.

In some embodiments of the method, the connectors are cords or straps.

Another aspect of the method is a kit for installing a soffit vent as described herein, the kit comprising the components recited herein and a stencil for providing markings on the soffit to indicate dimensions of the opening to be cut into the soffit.

In some embodiments of the kit, the kit further comprises instructions for installing the soffit vent.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

Rationale

Figure 1A:
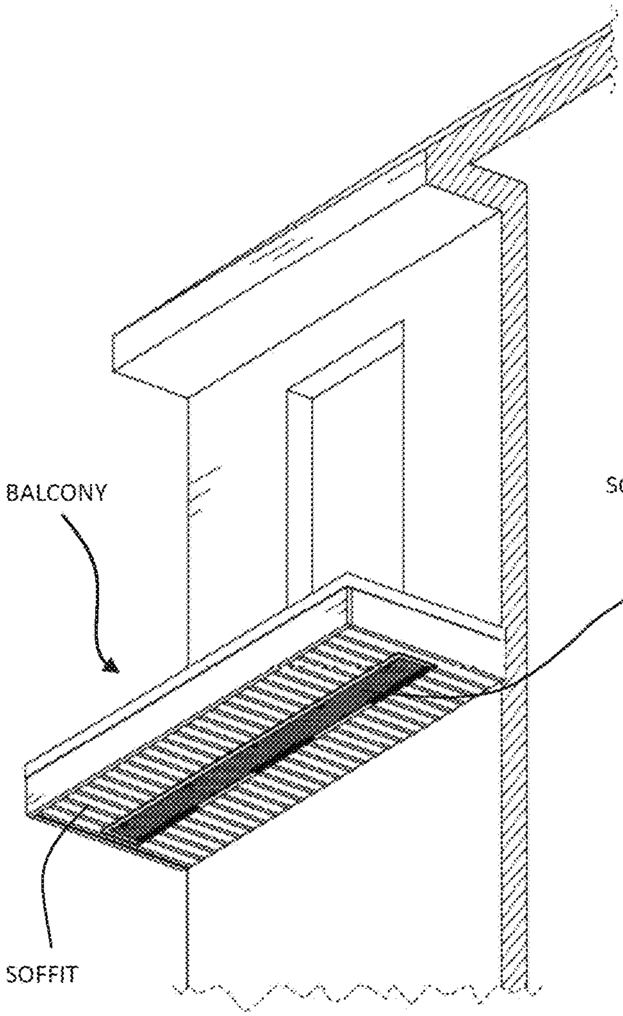
FIG. 1A is a perspective view of a soffit vent 10 installed on a soffit. The soffit vent 10 is in the closed position.

The present inventor has recognized that while building codes are expected to change to prevent accidents such as the balcony collapse which occurred in Berkeley, California in 2015, it will not be feasible in most cases to redesign older buildings to meet these revised codes. As such, visual inspection of the structures contained within the soffit, including framing structures such as joists, for example, will be important to identify and address structural problems. However, there is presently no convenient way to do so. In recognizing this problem, the inventor has developed an appropriate solution involving provision of a soffit vent with features that allow a panel thereof to be removed from a soffit opening to an inspector to look inside the structure. Following the inspection, the panel of the soffit vent is conveniently replaced and retained in position. Therefore, one aspect of the invention is a method for retrofitting the soffit for this purpose. Another aspect of the invention is a device and kit for installing a soffit vent within an existing soffit.

General Features of Soffit Vent Embodiments

Embodiments of the method for retrofitting an existing soffit with a soffit vent include structural modification of the soffit to create an opening sufficient to allow an inspector to inspect framing members such as beams, joists or any other structural elements or components associated therewith for identification of any issues that could lead to structural failures. Such issues may include, but are not limited to, rotting of wood components, infiltration of water or excess humidity, growth of mold or infestations of insects such as termites or infestations of destructive pests such as mice, rats, squirrels, bats and snakes, for example. The opening may be of any shape (such as square, rectangular or circular) or of any dimension deemed convenient to provide visual inspection of the interior space above the soffit. In some embodiments, the opening has an area sufficient to permit an inspector to place his or her head into the opening to facilitate the inspection. In other embodiments, where the area required to be inspected is smaller, it may be deemed that the visual inspection can be adequately conducted by the inspector looking inside a smaller opening in the soffit without placement of the inspector's head therewithin.

In general, embodiments of the soffit vent include a retention mechanism for reversibly holding a panel of the soffit vent in place over the opening in the soffit. The reversible retention mechanism may be any type of mechanism which reversibly holds the soffit vent in place to completely cover the opening, while permitting the soffit vent panel to be removed from the opening to permit the visual inspection described hereinabove. An optional, yet advantageous additional feature is provided by a flexible or pivotable connector to keep a panel of the soffit vent connected with the soffit or a frame disposed around the edges of the opening in the soffit. In embodiments which do not include the pivotable or flexible connector, the panel of the soffit vent is completely removable from the opening and the edges thereof. In such embodiments, the panel of the soffit vent panel is removed and placed elsewhere while the inspection is conducted. Upon completion of the inspection, the panel of the soffit vent is replaced over the opening and held in place by the reversible retention mechanism.

Certain embodiments of the reversible retention mechanism include one or more reversible fasteners pivotable retaining members or latches, including, for example, spring-biased latches. The reversible fasteners, pivotable retaining members or latches may be essentially of any form which permits the soffit vent to be held in place over the opening when the fasteners, pivotable retaining members or latches are engaged and then disengaged to permit the soffit vent panel to be at least partially moved away from the opening to permit the visual inspection to take place.

In some embodiments, the pivotable or flexible connector keeps the soffit vent panel connected with one or more edges of the opening when the opening is uncovered to keep it in close proximity while an inspection is conducted, to facilitate its access for replacement. In such embodiments, the pivotable or flexible connector mechanism may include one or more hinges or one or more flexible connecting members such as straps, cords or similar items. Such connectors simplify the process of replacing the soffit vent panel over the opening when the inspection is performed by an individual on a ladder or other elevated structure with limited options available for placement of the soffit vent panel. In one general example, one or more hinges are provided to connect one side of the soffit vent panel with one side of the opening. When the soffit vent panel is disengaged from the opening by disengaging the retention mechanism, it simply hangs from the hinge. In another general example, one or more straps or cords are connected between the soffit and the soffit vent. When the soffit vent panel is disengaged from the opening by disengaging the retention mechanism, the soffit vent panel hangs from the straps or cords in close proximity to the opening. Both of these general examples allow the inspector to have free access to the opening while keeping the soffit vent in close proximity for convenient replacement when the inspection is complete.

In certain general embodiments, a frame is provided in association with at least a portion of the edge of the opening. Some general embodiments include a frame to cover all edges of the opening. Such general embodiments provide enhanced structural integrity to the opening as well as providing surfaces for mounting the reversible retention mechanism and/or the pivotable or flexible connector.

In some embodiments, the soffit has a defined length and defined width and the soffit vent has dimensions of at least about half of the defined length and the defined width of the soffit. In other embodiments, the soffit vent has dimensions of about two-thirds of the defined length of the soffit or up to about 95% of the defined length of the soffit.

In the ensuing description, example embodiments will be discussed with reference to the Figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Example Embodiment: An Elongated Hinged Soffit Vent

An example embodiment of a soffit vent will now be described with reference to FIGS. 1 to 5.

Figure 1B:
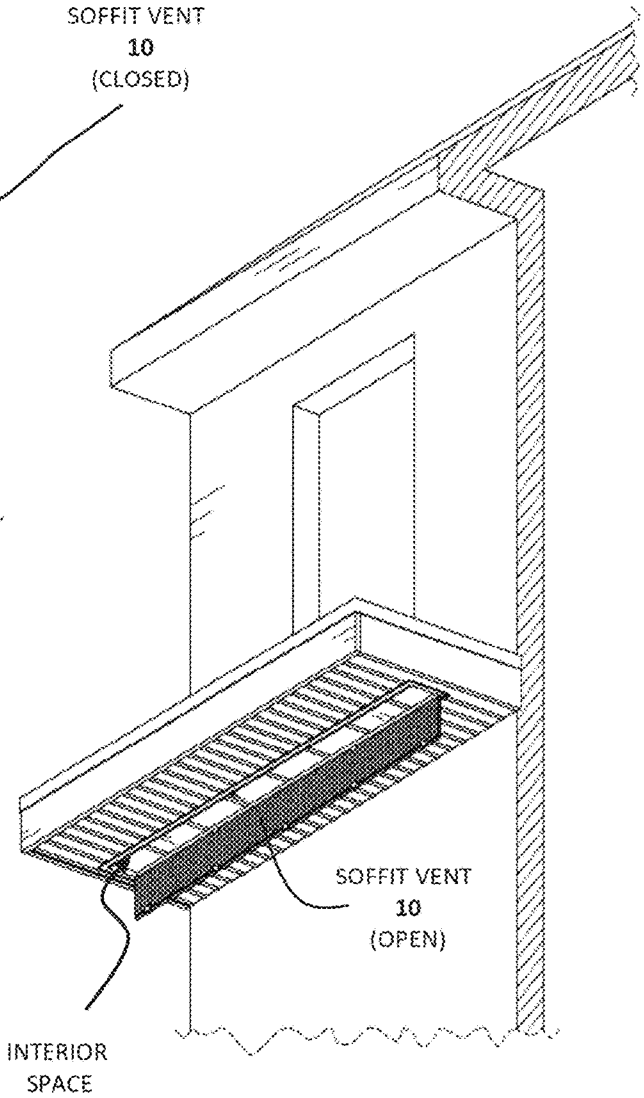
FIG. 1B is perspective view of the soffit vent 10 of FIG. 1A in the open position.

In this particular example embodiment, an assembly of components which is herein referred to as "soffit vent 10" provides inspection access to a soffit below a balcony having a length of about 11 feet and a width of about 4 feet. FIG. 1A shows a perspective view of this soffit vent 10 in the closed position covering an opening in a soffit on the underside of the balcony. FIG. 1B shows a similar view with the soffit vent 10 in the open position exposing the opening in the soffit. In this example, the soffit vent 10 has a length of about 10 feet and a width of about 9 inches. Features of this embodiment 10 are illustrated in FIGS. 2 to 5.

Figure 2A:
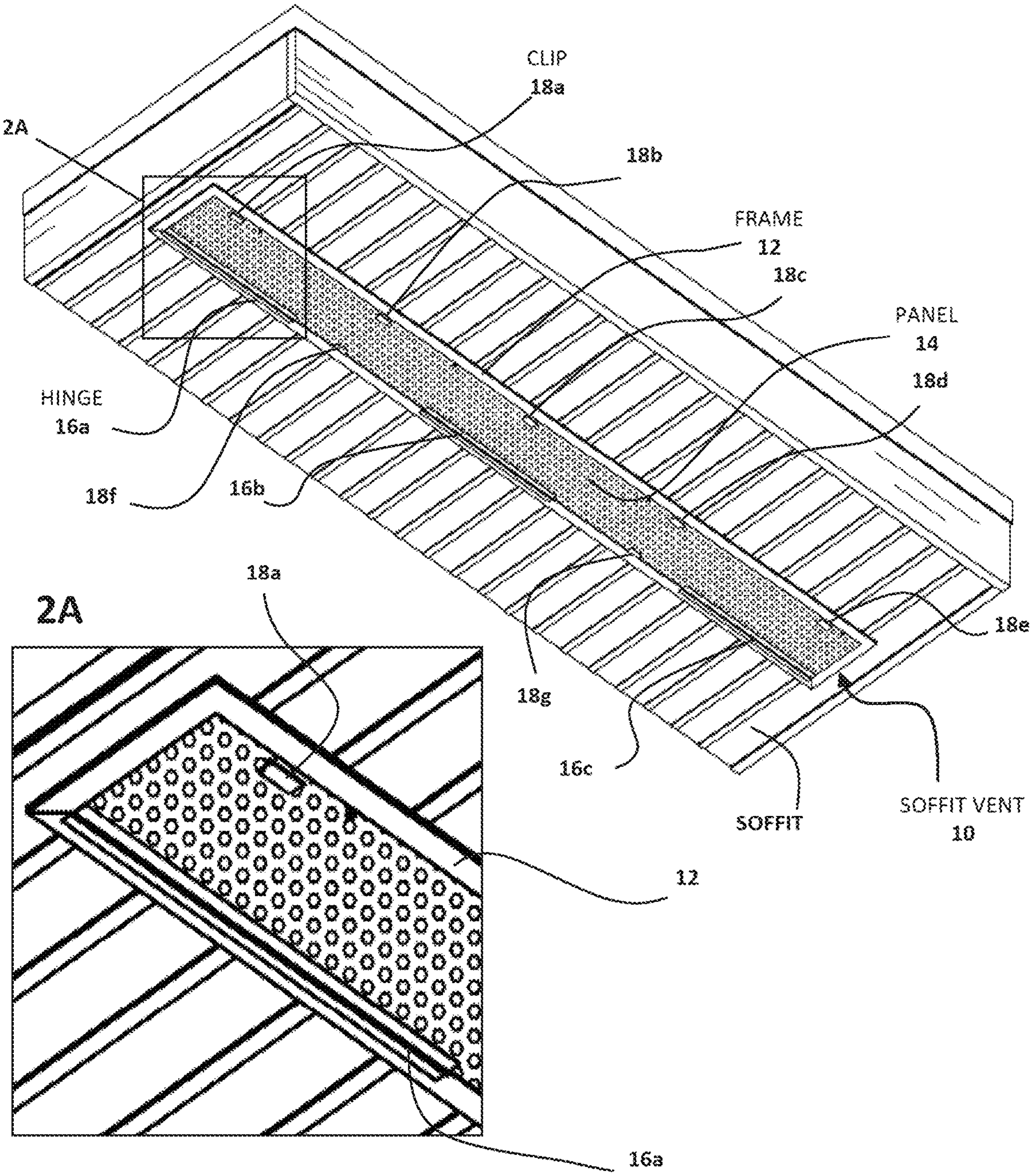
FIG. 2A is a perspective view of soffit vent 10 installed on a soffit in a larger view with an expanded inset 2A to more clearly show the features contained therein. The soffit vent 10 is in the closed position.
Figure 2B:
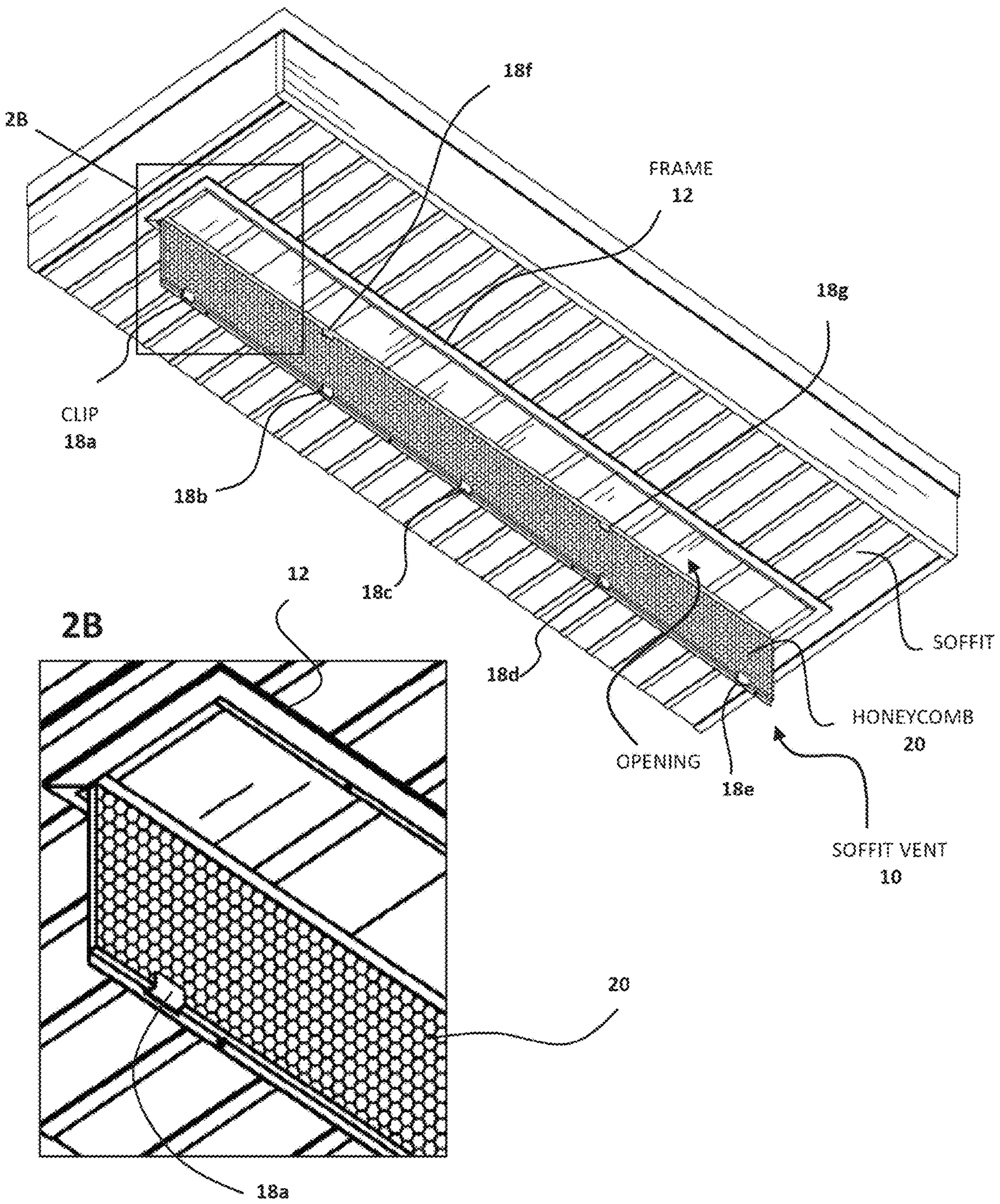
FIG. 2B is the same perspective view FIG. 2A with an expanded inset 2B to more clearly show the features contained therein. The soffit vent 10 is in the open position.

Turning now to FIGS. 2A and 2B, there are shown views of the soffit vent 10 in open and closed positions respectively, each with a magnified inset to indicated additional detail. It is seen that the soffit vent 10 includes a frame 12 and a panel 14 which is dimensioned to be held in place within the frame 12. While this embodiment includes frame 12. It is to be understood that alternative embodiments may be constructed without a frame or with a partial frame. In this embodiment, the panel 14 is perforated at regular intervals to provide ventilation. The extent of ventilation and the number of perforations may be different in different embodiments, depending upon the potential need for ventilation of the interior space above the soffit.

FIG. 2A shows that hinges 16*a*, 16*b* and 16*c* are provided to connect one side of the frame 12 with the panel 14. In this particular embodiment, the hinges 16*a*, 16*b* and 16*c* each have the same dimensions and are of the type known as a "piano hinge." Piano hinges are long hinges and are well suited for providing hinging of a long component to another surface, such as the elongated rectangular panel 14 of the present embodiment 10. Other types of hinges or other pivoting or flexible connecting members may be used in alternative embodiments described hereinbelow. When comparing FIGS. 2A and 2B it is seen that the panel 14 pivots on the aligned hinges 16*a*, 16*b* and 16*c* to move away from the opening in the soffit. The hinges 16*a*, 16*b* and 16*c* connect the panel 14 and components connected thereto with the frame 12 to allow an inspector to conveniently open and close the panel 14 of the soffit vent 10.

A rectangular honeycomb structure 20 with dimensions slightly smaller than those of the panel 14 is connected to the upper surface of the panel 14 by a series of clips 18*a*-*g*. The honeycomb 20 allows passage of air through its spaces and provides an automatically activated heat or fire barrier, as it is formed of or covered with an intumescent material which expands when heated to cover the spaces to prevent movement of fire and/or gases as well as heat transfer.

Figure 5:
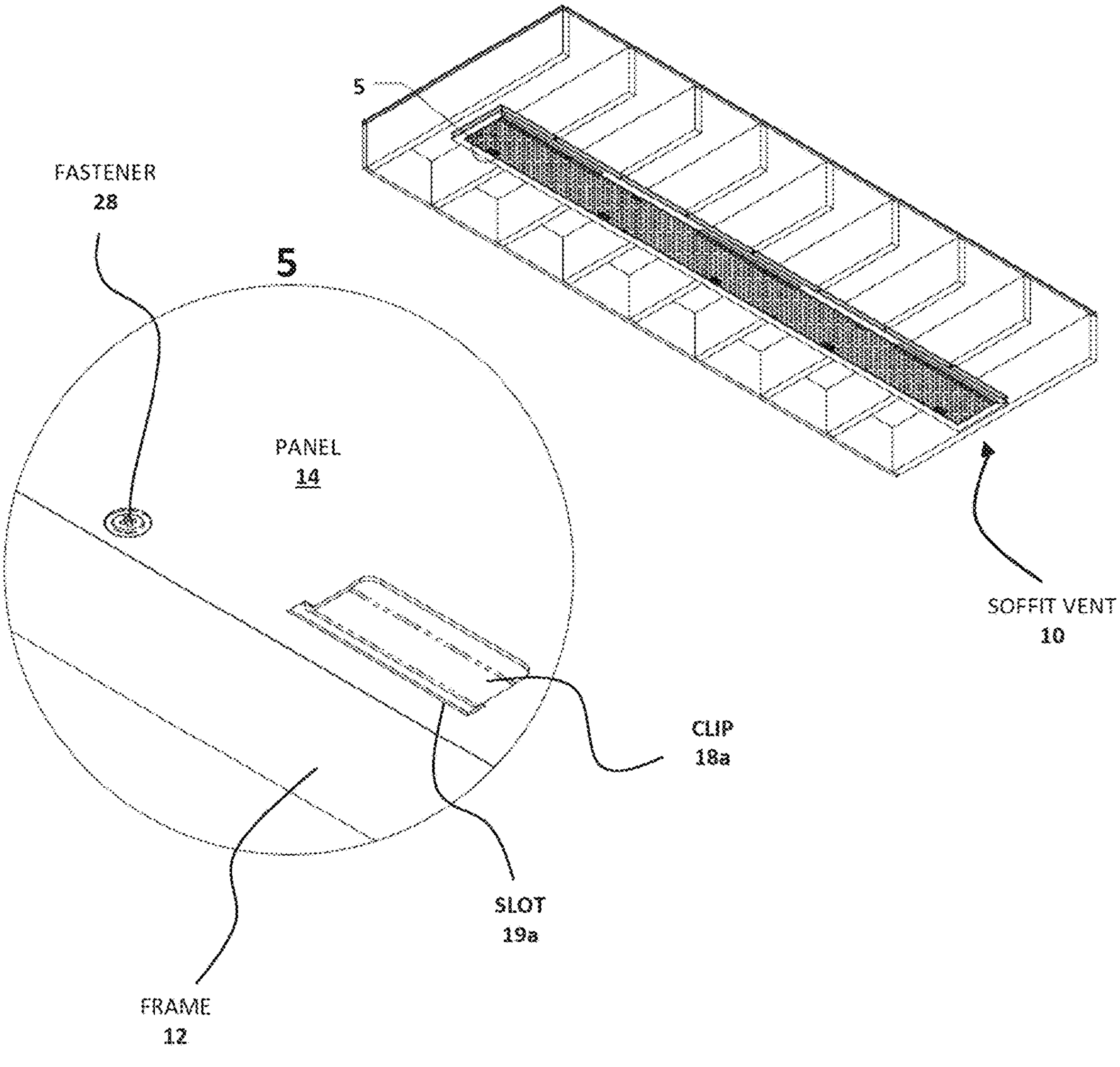
FIG. 5 is an additional perspective view of the soffit vent 10 in the closed position with an inset 5 showing detail of a clip 18*a* and a fastener 28.

An expanded view of one of the clips 18*a* is shown in the inset of FIG. 5, where it is seen that one edge of the clip 18*a* is placed in a slot 19*a* formed in the panel 14 adjacent to the frame 12. The upper side of the clip 18*a* is shaped to form a groove for holding the honeycomb 20 on the inside surface of the panel 14, as shown in FIG. 2A.

Figure 3:
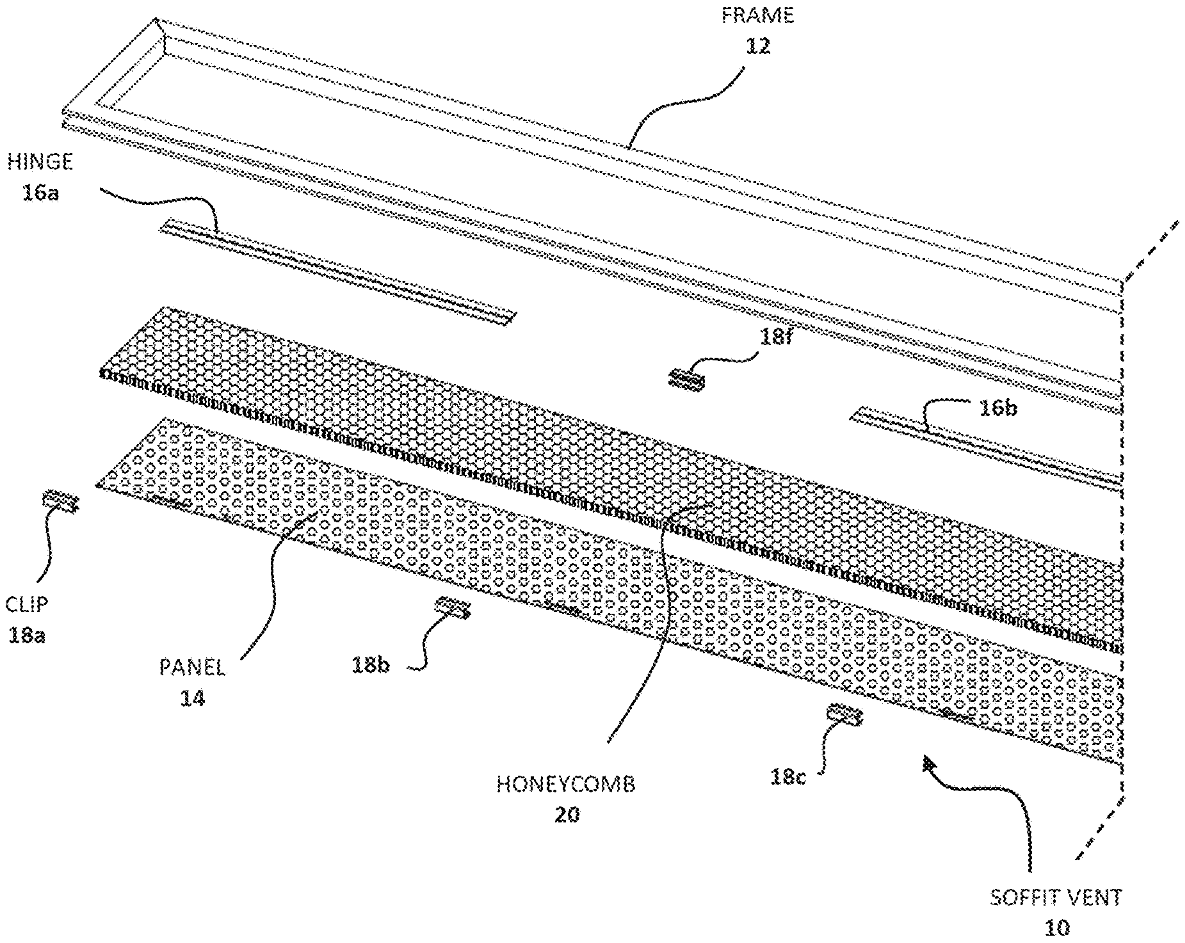
FIG. 3 is a partial exploded view of the soffit vent 10.

FIG. 3 is a partial exploded view of the components of this embodiment of the soffit vent 10 with the partial view representing approximately half of the structure, with the missing half having similar components as shown in FIGS. 2A and 2B. It is to be understood that all three hinges 16*a*, 16*b* and 16*c* form similar connections between the panel 14 and the frame 12 and that all seven of the clips 18*a*-*g* hold the honeycomb 20 in place on the upper surface of the panel 14. Alternative embodiments may employ alternative means for holding the honeycomb 20 in place on the panel 14 such as adhesives, for example. Alternative embodiments may exclude the honeycomb 20 and the clips 18*a*-*g* if it is deemed that the heat and fire barrier is not needed, or if its presence interferes with structures located above the soffit.

Figure 4A:
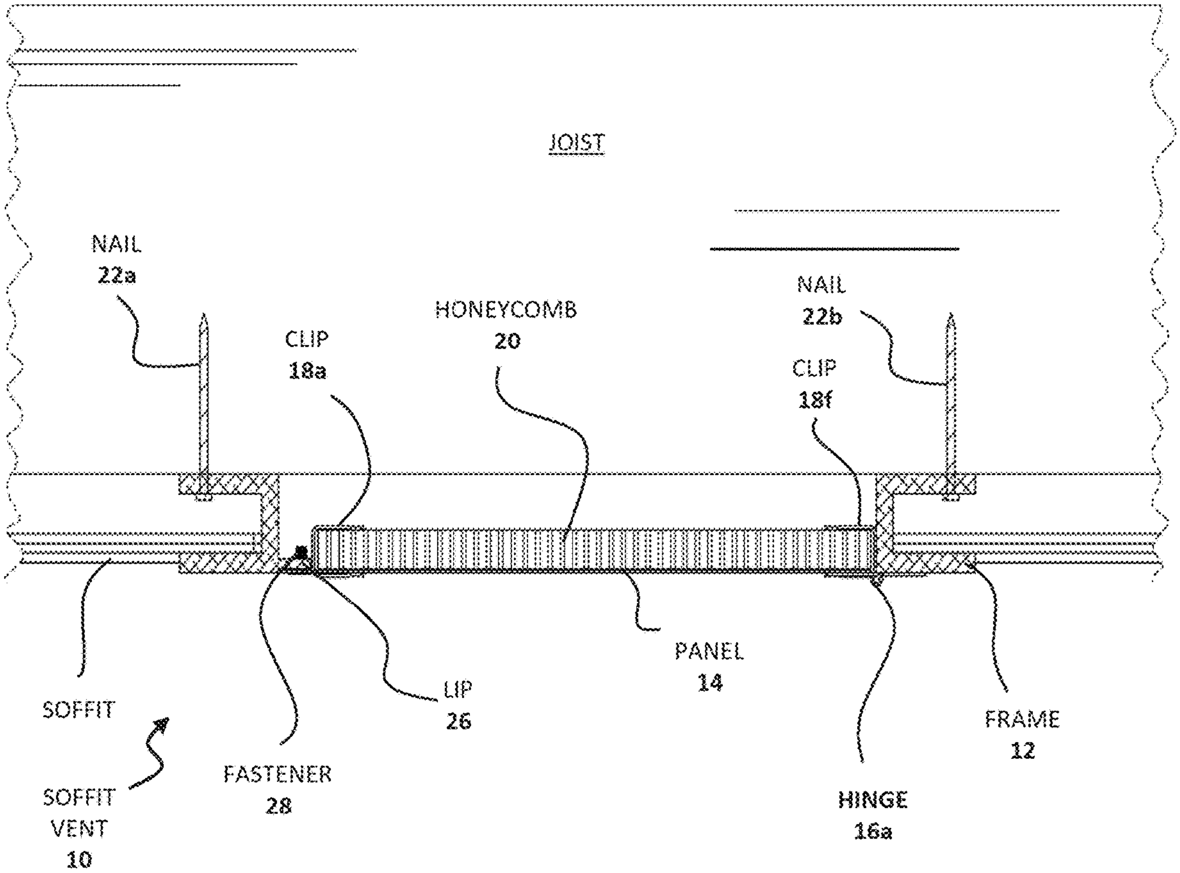
FIG. 4A is an end-on cross-sectional view of the soffit vent 10 installed on a soffit and showing the interior space above the soffit. The soffit vent 10 is in the closed position in this view.
Figure 4B:
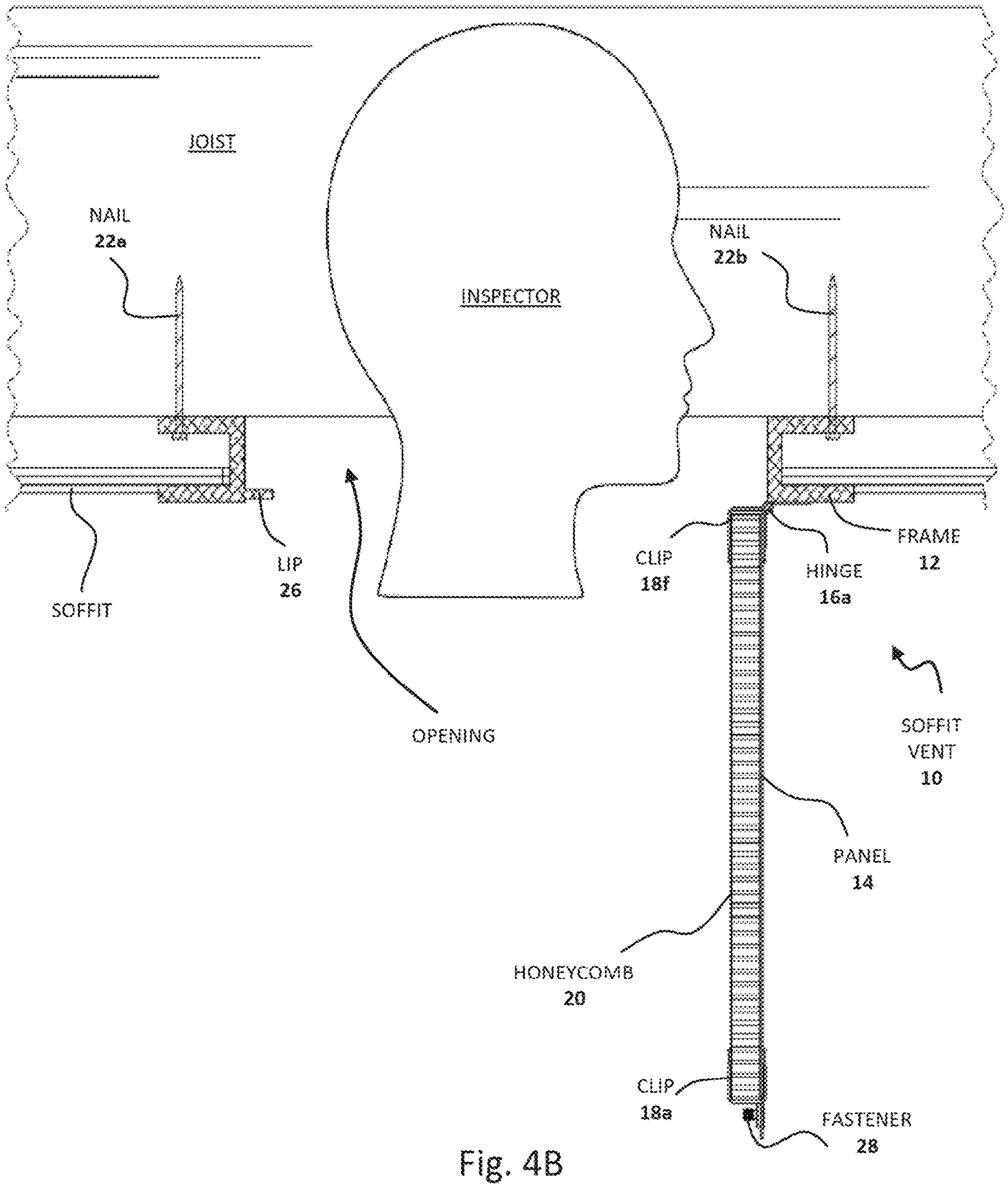
FIG. 4B is an end-on cross-sectional view of the soffit vent 10 similar to the view of FIG. 4A. The soffit vent 10 is in the open position in this view. The outline of an inspector is shown indicating that the opening is sufficiently wide to allow the inspector's head to enter the opening to facilitate viewing of the interior space.

Arbitrary similar cross-sectional views of the soffit vent 10 are shown in FIGS. 4A and 4B, wherein the soffit vent 10 is closed in FIG. 4A and open in FIG. 4B. Additional features seen in these views include the fastening of the frame 12 between the soffit and a joist located in the interior space above the soffit by a pair of nails 22*a* and 22*b* extending through the frame 12 and into the joist. Alternative fastening means for connecting the frame to the soffit can be provided in alternative embodiments and such alternatives may not necessarily require connecting the frame to a joist. Such alternatives will depend upon the characteristics of the soffit itself, particularly whether it is sufficiently rigid to support the weight of the entire soffit vent 10. In alternative embodiments, other structures may be present within the interior space above the soffit, which may be appropriate for attachment of the frame 12.

Figure 6:
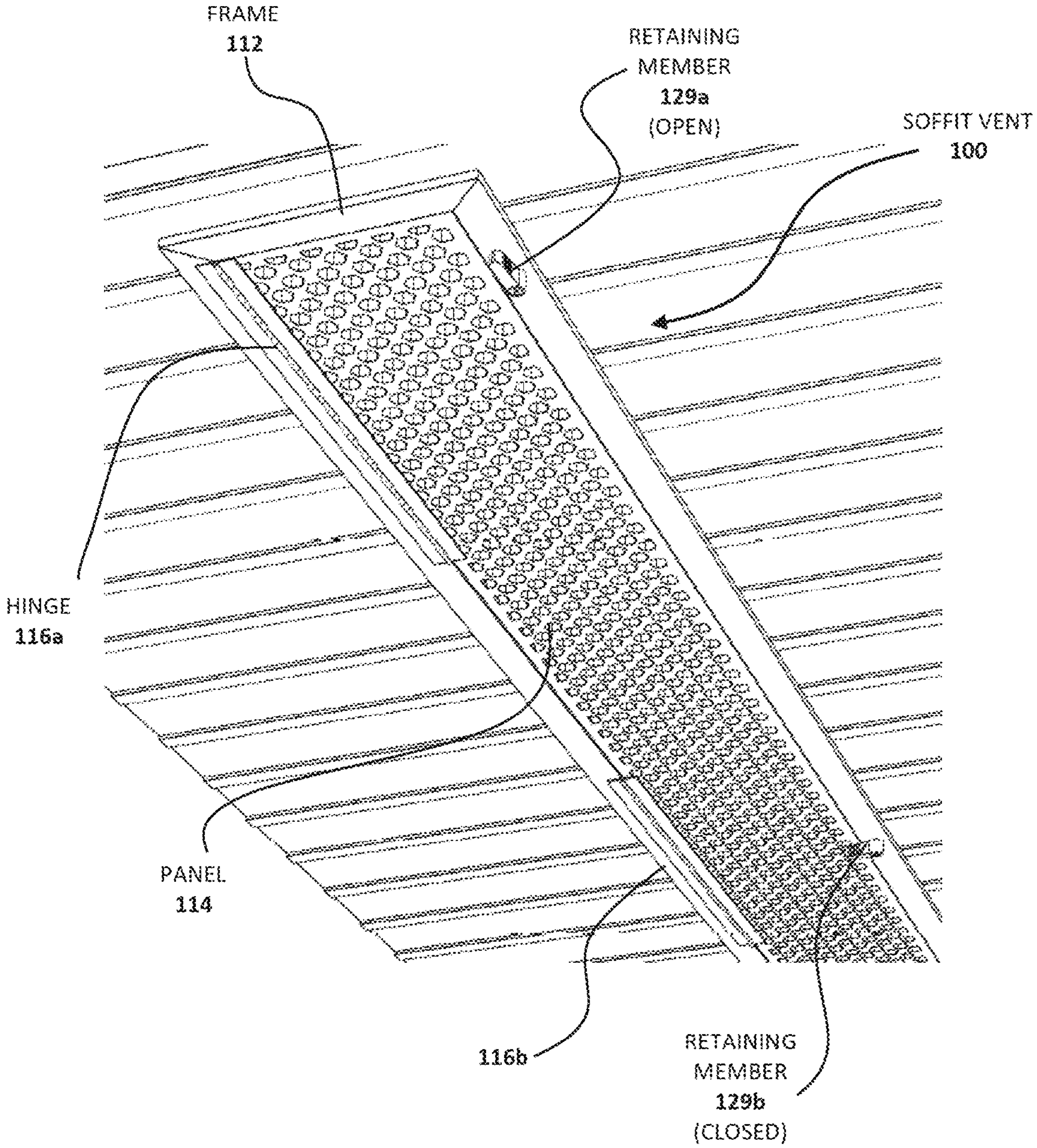
FIG. 6 is a partial perspective view of another embodiment of a soffit vent 100 which is similar to soffit vent 10 with the exception of having an alternative retention mechanism with two pivoting retention members 129*a* and 129*b* seen in this view.

It is seen in FIGS. 4A and 4B that the frame 12 is provided with a lip 26 on one inner edge for providing a surface to allow contact with an outer edge of the panel 14 for fastening the panel 14 to the lip 26 of the frame 12. In this embodiment, the fastener is a Philips head screw 28 (see FIG. 5) but other types of screws, bolts or other fasteners appropriate for retaining two flat surfaces in association with each other may be used as alternatives (one such alternative is shown in FIG. 6, which will be described hereinbelow).

FIG. 4B indicates that when the soffit vent 10 is open, an inspector may place his or her head through the opening and into the interior space above the soffit to conduct a visual inspection, thereby determining if interior components remain structurally acceptable and/or if excess moisture or destructive pests are present in the interior space.

Features of Alternative Embodiments

As noted hereinabove, alternative features may be provided in alternative embodiments.

The mechanism for connecting the panel to the frame of the soffit vent may take different forms. In the main soffit vent embodiment 10 described above, the connecting mechanism is provided by one or more fasteners 28 connecting the lip 26 of the frame 12 with an edge of the panel 14. Other retention mechanisms are provided in alternative soffit vent embodiments, such as the pivoting retaining members 129*a* and 129*b* shown in soffit vent embodiment 100 of FIG. 6. These retaining members 129*a* and 129*b* are each pivotally fastened to the frame 112, allowing them to pivot on an axis perpendicular to the plane of the frame 112 to move one end across the outer surface of the panel 114 when it is in the closed position, thereby retaining it at that position. In FIG. 6, retaining member 129*a* is arranged parallel to the frame 112 and is therefore in the open position while retaining member 129*b* is arranged perpendicular to the frame 112 which provides the effect of retaining the panel 114 in place over the opening within the frame 112.

Figure 7:
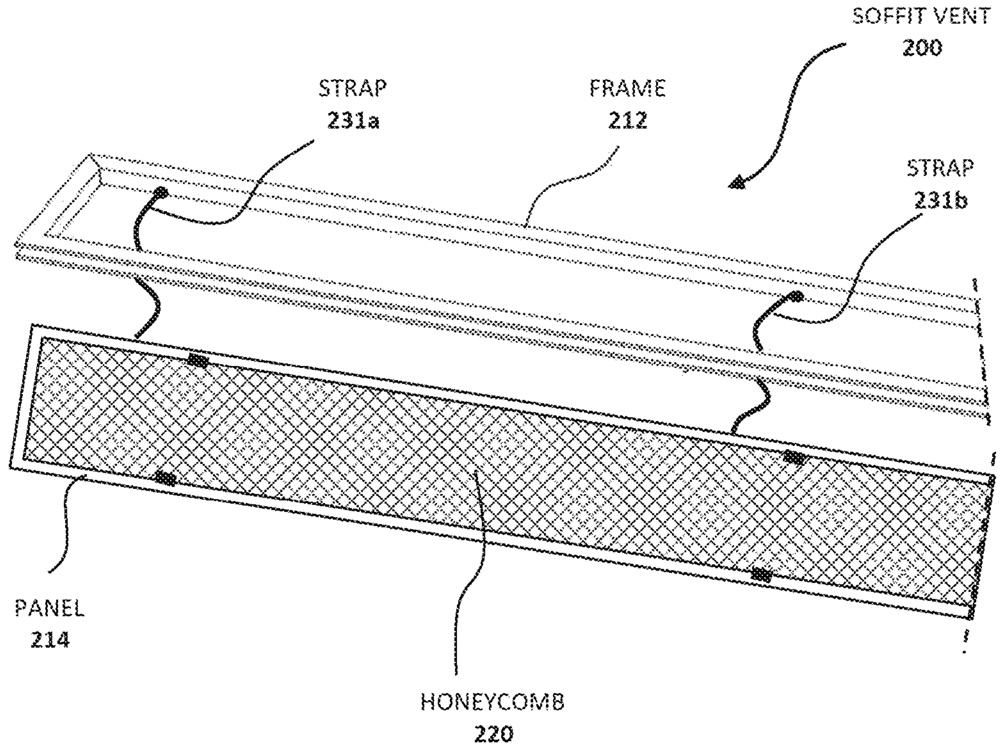
FIG. 7 is a partial perspective view of another embodiment of a soffit vent 200, which is similar to soffit vent 10 with the exception of having straps 231*a* and 231*b* shown as alternatives to hinges to keep the panel 214 connected to the frame 212 when the panel 214 is disengaged from the frame 212.

The mechanism for pivotably or flexibly connecting the panel to the frame of the soffit vent may take different forms. In the main soffit vent embodiment 10 described above, the retention mechanism is provided by three piano hinges 16*a*, 16*b* and 16*c*. In alternative embodiments, more or fewer hinges may be provided and the hinges may be other types of hinges. In other alternative embodiments, the connecting mechanism may be provided by one or more straps, cords or other flexible connecting members such as the arrangement shown in FIG. 7, for example, where the partial view of the soffit vent 200 has a frame 212 similar to the frame discussed in the embodiment 10 of FIGS. 1 to 5. In FIG. 7, it is seen that the panel 214 is connected to the frame 212 by at least two straps 231*a* and 231*b*. This arrangement allows the panel 214 to hang from the frame 212 while an inspection is conducted. Following the inspection, the inspector has easy access to the hanging panel 214 (as well as its connected honeycomb 220) and can easily replace it within the frame 212.

Figure 8A:
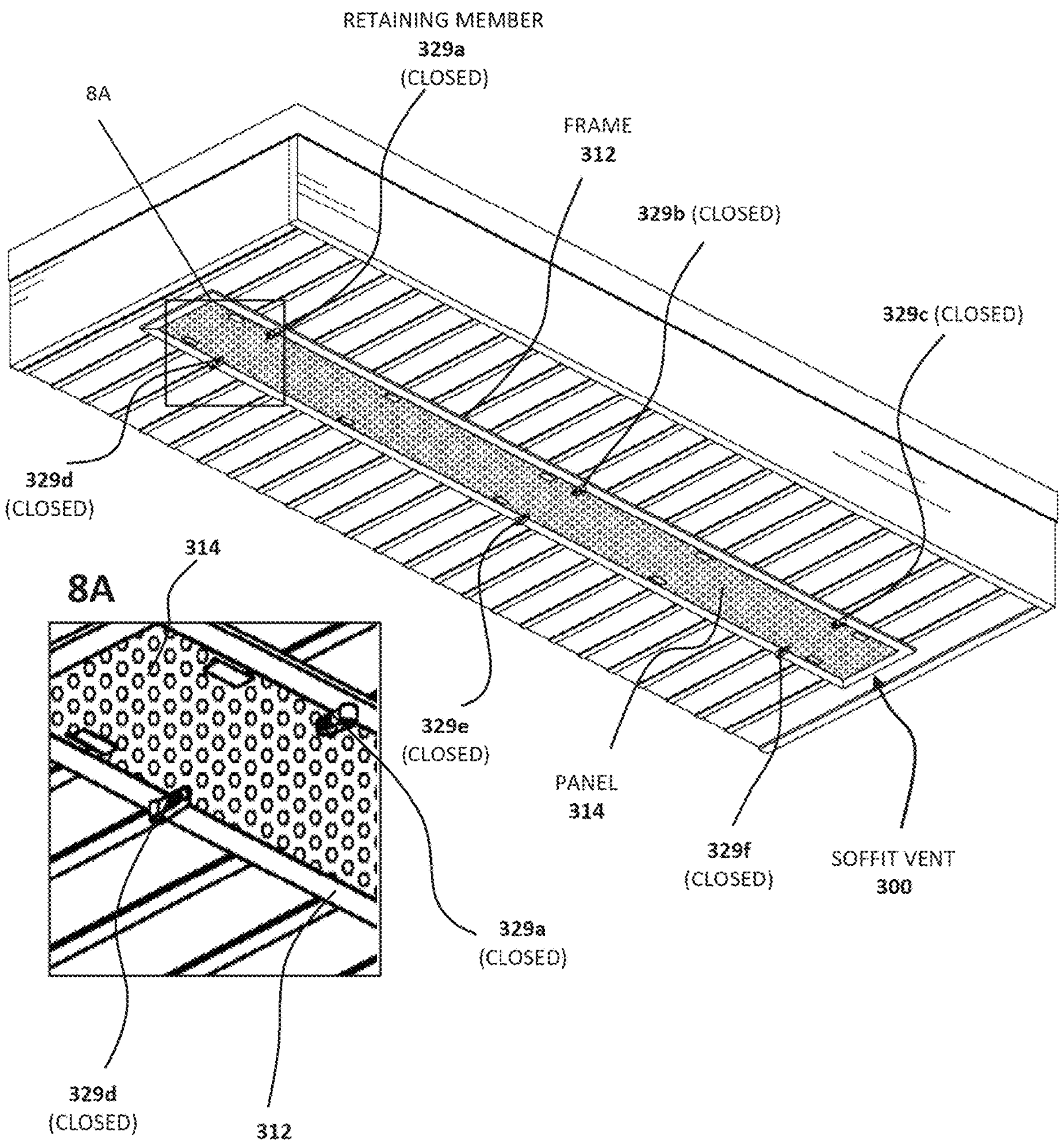
FIG. 8A is a perspective view of another embodiment of a soffit vent 300 in the closed position, wherein there is no connection between the panel 314 and the frame 312 other than the retention provided by retention members 329*a-f*.
Figure 8B:
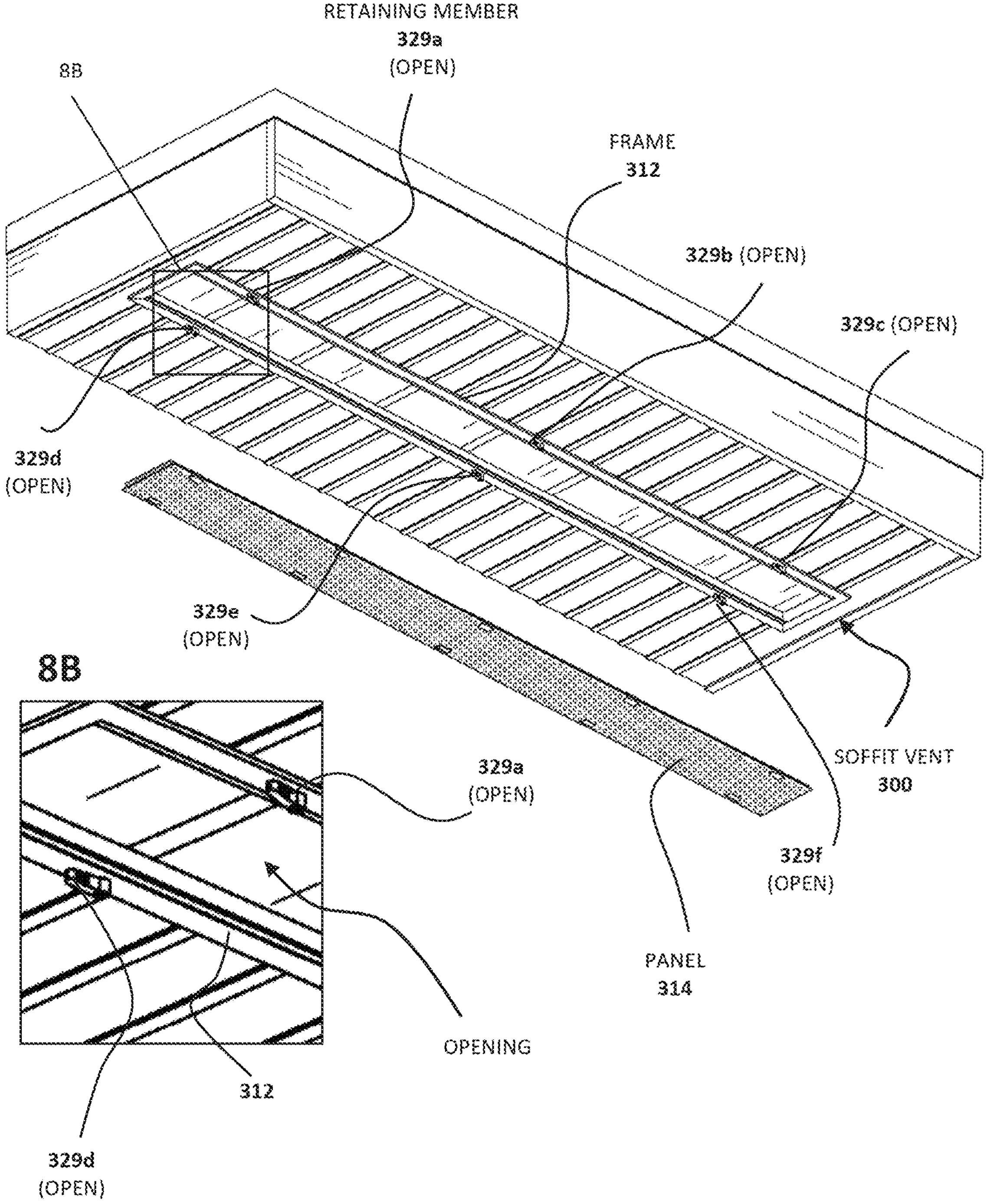
FIG. 8B is a perspective view of the embodiment of FIG. 8A shown in the open position wherein there is no connection between the panel 314 and the frame 312.

In another alternative embodiment 300, shown in FIGS. 8A and 8B, the panel 314 does not have a pivotable or flexible connector. As a result, when all six of the retention members 329*a-f* are moved to the open position as shown in FIG. 8B, the panel 314 is no longer retained within the frame 312. The panel 314 must therefore be placed elsewhere. In some embodiments, a handle, loop or hook may be incorporated into the panel 314 to facilitate its transport to another location and/or to hang it on a ladder or other structure.

Method for Installing/Retrofitting a Soffit Vent on a Soffit

Another aspect of the invention is a general method for installing a soffit vent on an existing soffit. If the soffit is already installed on a building, the method may be considered a retro-fitting method. In other embodiments of the method, a soffit vent is installed in a soffit before the soffit is installed on a structure, in which case, the method would not be considered a retro-fitting method.

In the retrofitting method, an opening is cut in an existing soffit on a building. This may be accomplished by determining the dimensions of the opening required to fit a particular soffit vent therein and cutting an opening in the soffit to match those dimensions. Alternatively, a stencil for placing cutting marks on the soffit to match a particular soffit vent assembly may be provided to facilitate this process. After the opening is provided, the opening is covered with a soffit vent having a reversible retention mechanism allowing the soffit vent to be removed from the opening, thereby permitting the visual inspection and allowing subsequent replacement of the soffit vent to cover the opening and retention of the soffit vent over the opening.

In some embodiments, a frame is provided on a least a part of the boundary of the opening, while in other embodiments, the frame is provided on the entire boundary of the opening. In some embodiments, the reversible retention mechanism comprises at least one retention member, or fastener for retaining the soffit vent within the frame. In some embodiments the retention member is an elongated pivotable member while in other embodiments, the retention member is a cord or strap connecting the soffit vent panel with the frame of the soffit vent.

Kit for Installation/Retrofitting of a Soffit Vent on a Soffit

Another aspect of the invention is a kit for installing a soffit vent on a soffit. The kit includes components for assembling a soffit vent, including a frame, a panel and one or more retention members for reversible retention of the panel in place over the opening. Some embodiments of the kit include the components described hereinabove for soffit vent embodiments 10, 100, 200 or 300 or any of the alternative embodiments described herein. Other kit embodiments further include a stencil for providing markings on a soffit to indicate the boundary of the opening to be made in the soffit. Some kit embodiments include instructions for installing the soffit vent on a previously installed soffit or a soffit which has not yet been installed on a building or structure.

Equivalents and Scope

Other than described herein, or unless otherwise expressly specified, all of the numerical ranges, amounts, values and percentages, such as those for amounts of materials, elemental contents, times and temperatures, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs.

While this invention has been particularly shown and described with references to embodiments thereof, it will be understood by those skilled in the art that various changes in form and details may be made therein without departing from the scope of the invention encompassed by the appended claims.

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context.

It is also noted that the term "comprising" is intended to be open and permits but does not require the inclusion of additional elements or steps. When the term "comprising" is used herein, the term "consisting of" is thus also encompassed and disclosed. Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. Where the term "about" is used, it is understood to reflect +/−10% of the recited value. In addition, it is to be understood that any particular embodiment of the present invention that falls within the prior art may be explicitly excluded from any one or more of the claims. Since such embodiments are deemed to be known to one of ordinary skill in the art, they may be excluded even if the exclusion is not set forth explicitly herein.

What is claimed is:

1. A method for retrofitting a soffit of an exterior elevated assembly with a walking surface to provide the soffit with a soffit vent, the method comprising:

a) cutting the soffit to remove a portion thereof and provide an opening therein; and b) covering the opening with a soffit vent panel having a reversible retention mechanism allowing the soffit vent to be removed from the opening, thereby permitting a visual inspection of a support structure for the walking surface and allowing subsequent replacement of the soffit vent to cover the opening, the soffit vent panel including a frame covering boundary edges of the opening, wherein the frame comprises a member configured to extend into and above the opening and to make contact with a portion of the support structure which is located directly above the opening and between the boundary edges of the opening.

2. The method of claim 1, wherein the exterior elevated assembly is a balcony or deck having a defined length, and wherein the opening extends across a majority portion of the length.

3. The method of claim 1, wherein the opening has a width of at least about 9 inches.

4. The method of claim 1, wherein the reversible retention mechanism comprises at least one fastener or retention member for holding the vent panel in proximity to the panel frame.

5. The method of claim 4, wherein the fastener is a screw or bolt connecting the vent panel to the panel frame.

6. The method of claim 5, wherein the panel frame comprises an inner lip on one internal edge and the screw or bolt connects an edge of the vent panel to the lip.

7. The method of claim 4, wherein the retention member is pivotably connected to the panel frame and pivots on an axis perpendicular to the outer surface of the soffit or the panel frame between a retention position and an open position.

8. The method of claim 1, further comprising a pivoting or flexible connector for connecting one side of the vent panel to the soffit or to one side of the panel frame.

9. The method of claim 8, wherein the pivoting or flexible connector is a hinge.

10. The method of claim 9, wherein the hinge is a piano hinge.

11. The method of claim 8, wherein the flexible connector is a cord or strap.

12. The method of claim 1, further comprising a heat activatable fire barrier connected to an inside surface of the vent panel.

13. The method of claim 12, wherein the heat activatable fire barrier is formed of or covered with an intumescent material which expands when heated.

14. The method of claim 1, wherein the vent panel is provided in a kit including instructions for the steps of cutting the soffit and covering the opening.

15. The method of claim 14, wherein the kit further comprises at least one fastener or retention member for holding the vent panel in proximity to the panel frame.

16. The method of claim 14, wherein the kit further comprises a pivoting or flexible connector for connecting one side of the vent panel to the soffit or to one side of the panel frame.

17. The method of claim 14, wherein the kit further comprises a stencil for providing markings on the soffit to indicate dimensions of the opening.

18. The method of claim 1, further comprising connecting the member to the portion of the support structure.

* * * * *